United States Patent [19]

Hrastnik

[11] 4,367,039
[45] Jan. 4, 1983

[54] WET MODULAR FILM PRINTER

[75] Inventor: Walter Hrastnik, Chicago, Ill.

[73] Assignee: Bell & Howell Company, Chicago, Ill.

[21] Appl. No.: 356,966

[22] Filed: Mar. 11, 1982

Related U.S. Application Data

[63] Continuation of Ser. No. 170,478, Jul. 21, 1980, abandoned.

[51] Int. Cl.³ .............................................. G03B 27/20
[52] U.S. Cl. ...................................... 355/91; 355/108
[58] Field of Search ................ 355/90, 91, 103, 108, 355/111; 352/222

[56] References Cited

U.S. PATENT DOCUMENTS

| | | | |
|---|---|---|---|
| 2,890,621 | 6/1959 | Suits | 352/222 |
| 3,664,738 | 5/1972 | Cameron | 355/91 |
| 4,099,869 | 7/1978 | Lang | 355/108 |
| 4,105,329 | 8/1978 | Carter | 355/91 |
| 4,154,528 | 5/1979 | Watson et al. | 355/90 |
| 4,223,985 | 9/1980 | Carter et al. | 352/222 |

*Primary Examiner*—Monroe H. Hayes
*Attorney, Agent, or Firm*—Robert J. Schneider; Timothy N. Trop; Roger M. Fitz-Gerald

[57] ABSTRACT

A wet modular film printer having a plurality of removable modules upon which film printer components are mounted including a liquid immersed, capstanless printing head. The printing head immersion liquid is continuously recirculated and filtered by means of a recirculation draw off near the top of the liquid surface and a recirculated liquid return downstream of the printed head. Liquid containing areas are all enclosed and a negative pressure is maintained to remove any noxious vapors. After printing, the liquid remaining on the raw stock and the negative is removed by a series of wipers, an air stripper and a drying column. The drying column uses heated air which flows countercurrent to the direction of film movement so that the air is progressively hotter along the film's path of movement.

13 Claims, 6 Drawing Figures

WET MODULAR FILM PRINTER

This is a continuation of application Ser. No. 170,478, filed July 21, 1980, now abandoned.

BACKGROUND OF THE INVENTION

1. Field of the Invention

This invention relates generally to wet photographic film printers, and more particularly to wet photographic film printers suitable for reproducing commercial quality movie film in large quantities.

2. Description of the Prior Art

Wet photographic film printers which use a printing head immersed in a liquid having an index of refraction very close to that of the printing negative are well known in the art. The wet printing process is effective to "fill in" and thus obscure scratches and abrasions on the negative so they do not appear in the final printed film. A variety of suitable liquids are known and several preferred liquids are set forth in an article entitled "Printing Motion Picture Film Immersed in a Liquid" published in the Journal of the Society of Motion Pictures and Television Engineers, October 1957 issue, Volume 66, pp. 607-615 hereby expressly incorporated by reference herein. A variety of different wet printers have been devised, such as those discussed in the article "Specifically Designed Total-Immersion Liquid Gate Printers" (March, 1974 Journal of the SMPTE, Volume 83, pages 163-169); however, the prior art has generally taken the form of continuous contact type liquid immersion printers such as are shown in U.S. Pat. Nos. 4,105,329 issued to Carter, 3,664,738 issued to Cameron, and 3,488,121 issued to Dassonville.

A number of difficulties have developed in connection with liquid immersion printers. The immersion of the raw stock and master and the high speeds that are involved often result in turbulence in the liquid which shows up as distortion in the printed film. In addition, after continued use dirt and other particulate matter tends to collect within the tank which can also distort the printed image. It is also necessary to remove the liquid from the film after printing. Because of the high speeds involved effective removal of the liquid is often a problem. In addition, the fumes generated by the immersion liquid are usually noxious resulting in some hazard to machine operators. Finally, the wet printers are generally incompatible with dry printing set-ups. Thus, those who wish to wet print must purchase an entirely new printing system at considerable expense.

SUMMARY OF THE INVENTION

Accordingly, it is an object of the present invention to provide a film printer that overcomes any of the disadvantages of the prior art film printers.

It is another object of the present invention to provide a film printer which permits interchangeability of common components so that the same equipment can be used for wet or dry printing.

It is still another object of the present invention to provide a means to limit the generation of turbulence in the region of the printing head so as to produce copies of greater clarity.

It is still another object of the present invention to provide a means to efficiently remove the liquid from the master and the printed raw stock after printing, at a high rate.

It is another object of the present invention to provide a means for the controlled draw off and recirculation of the immersion liquid.

It is another object of the present invention to provide a means for controlling the escape of fumes from the printer.

It is yet another object of the present invention to provide a means which removes particles from the immersion liquid without upsetting the immersion liquid and the quality of the printed film.

It is yet another object of the present invention to provide an improved air dryer for drying the printed film and the master.

These and other objects are accomplished by a wet film printer including a frame having a plurality of removable modules. A liquid submergible printing head is supported on the frame. Spaced from the printing head, retaining means are provided to retain the film master and raw stock in intimate contact over the printing head. Enclosure means are secured to the frame for retaining a printing head submersion bath and for retaining the fumes produced by the liquid. The enclosure means includes a liquid inlet situated away from the printing head and located near the bottom of the enclosure means and a liquid outlet located near the printing head situated near the top of the liquid bath. The printer also includes a means for drawing liquid through the outlet, filtering the liquid, and returning the liquid to the enclosure means through the liquid inlet. In addition, means to forward and take up the film raw stock and film master are provided.

BRIEF DESCRIPTION OF THE DRAWINGS

These and other objects and advantages of the present invention will be better understood by reference to the following detailed description and attached drawings, wherein.

DETAILED DESCRIPTION OF THE PREFERRED EMBODIMENT

Figure 1:
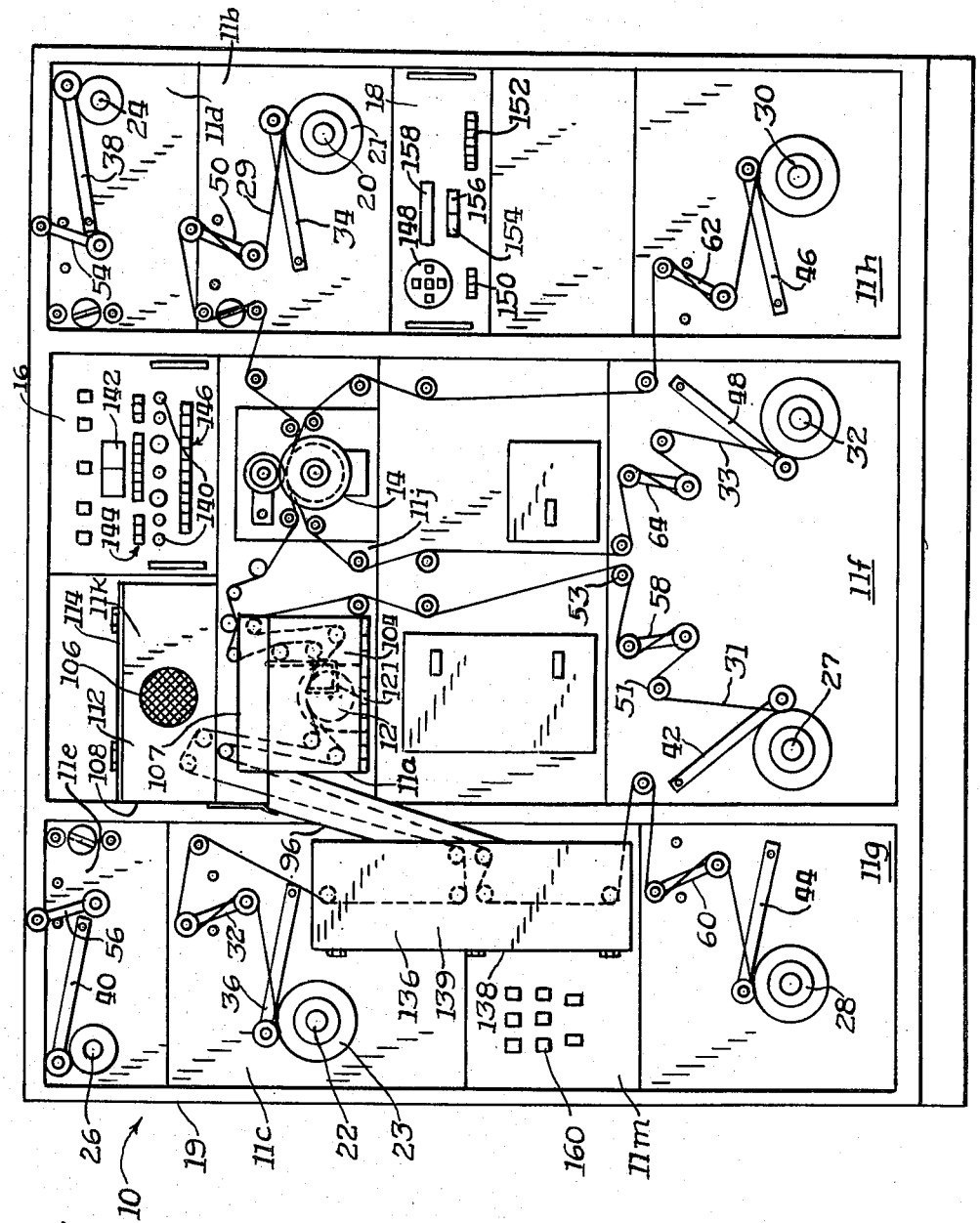
FIG. 1 is a front elevational view of a modular printer in accordance with the present invention.

Referring to the drawing, in accordance with a preferred embodiment of the present invention, there is illustrated in FIG. 1, a wet modular printer 10 including a plurality of removable panels or modules secured to a frame 19. The printer 10 includes a picture printing head 12 mounted on a removable module 11a, a sound track printing head 14 mounted on a removable module 11j, a power control panel 16, and an operator control panel 18. A pair of spindles 20 and 22 mounted on panels 11b and 11c respectively, are used to support a pair of reels 21 and 23 holding a first strip of raw film stock 29. Optionally a second pair of spindles 24 and 26, mounted on panels 11d and 11e respectively, are used to support a second strip of raw film stock when the spindles 20, 22 are not in use. A pair of spindles 27 and 28, mounted on panels 11f and 11g respectively, are used to support a picture negative and spindles 30 and 32, mounted on panels 11h and 11i respectively, support a sound track negative. Conveniently a pair of reel diameter sensing arms 34 and 36 are associated with each respective spindle 20 and 22. Similar sensing arms 38, 40, 42, 44, 46 and 48 may also be associated with the respective spindles 24, 26, 27, 28, 30 and 32. The function of the reel diameter sensing arms is to generate a signal representative of the amount of film wound on the reel for use by a circuit which controls the operation of film tensioning motors. An explanation of the operation of the reel diameter sensing arms, the drive motor for forwarding the film, and the film tensioning motors is contained in U.S. Pat. No. 4,154,528 issued to Watson on May 15, 1979, hereby expressly incorporated by reference herein. In addition, film tension sensing arms 50 and 52 are conveniently associated with each of the respective spindles 20 and 22. Similar tension sensing arms 54, 56, 58, 60, 62 and 64 may be associated with the respective spindles 24, 26, 27, 28, 30 and 32. The function of the tension sensing arms is to generate a signal useful by the tensioning motor controlling circuit to insure precise tension in the film as it is forwarded. An explanation of the operation of the film tension sensing arms and the associated motor control circuitry is also contained in the above-reference U.S. Patent already incorporated herein by reference. Each of the spindles 20, 22, 24, 26, 27, 28 and 30 may be driven by a separate tensioning motor which works against the tensioning motor associated with its paired spindle as well as against the drive motor which forwards the films. A drive motor may operate by means of sprockets within each printing head 12 and 14 to forward the raw stock film and master films by engaging conventional sprocket holes in those films.

In operation, a reel of picture negative 31 is placed on a spindle 27 and threaded between idler guide rollers 51 and 53 and other idler guide rollers over the printing head 12 and onto a second reel supported by the spindle 28. Similarly, a reel of sound track master 33 supported by the spindle 30 is threaded over the printing head 14 and onto the spindle 32. In a similar manner, a plurality of idler guide rollers including those on tension sensing arms 62, 64 guide the sound track negative 33 as it passes from the spindle 30 to the spindle 32. The reel of raw or unexposed film stock 29 is passed from the spindle 20 over the picture and sound negatives 31, 33 threaded over the respective printing heads 12 and 14 and onto the spindle 22. The raw film stock 29 is exposed by light from the picture and sound track printing heads 12 and 14 that shines through the respective picture and sound track negatives 31 and 33.

The use of two pairs of spindles 20, 22 and 24, 26 permits bidirectional operation of the printer and makes it unnecessary to rewind the picture and sound track negatives when a dry rather than a wet printing head is in use. As explained in the Watson patent, already incorporated by reference, printing proceeds in a first direction until the picture and sound track negatives are wound onto the spindles 28 and 32. The operation of the printer can then be reversed and the raw stock wound from the spindle 26 to the printing heads 14 and 12 and then onto the spindle 24.

A power control panel 16 may conveniently be used to set up the printer and a separate operator control panel 18 that contains all the necessary controls to operate the printer after it has been set up is also conveniently included. The printer 10 may be brought to operating speed in two steps. In the first step, the operating or running tension is gradually applied to the film by means of tensioning motors and in the second step the main drive motor is gradually brought up to speed. The power control panel 16 may contain a plurality of controls for adjusting the power applied to various light sources in the printer 10 and for monitoring several critical voltages, such as the voltages in the amplifiers and control logic that control the operation of the drive and tensioning motors. A plurality of control knobs 140 are conveniently used to adjust the voltages applied to the various light sources in the printer. The voltage monitor comprising a digital display 142 and a plurality of pushbuttons switches 144 may be used in conjunction with control knobs 140 to determine the exact voltage applied to each light source. Thus by depressing the pushbutton 144 associated with a particular light source and associated control 140, the voltage applied to that particular light source may be read on the display 142 as the control knob 140 is adjusted. In addition, certain critical voltages within the printer 10 may be readily monitored by depressing other pushbutton switches 144. For the sake of convenience, the nominal value of the critical voltage being monitored may be indicated on one of the switches 144 corresponding to that critical voltage. This permits the operator to determine the correctness of each critical voltage by simply comparing the value displayed on the display 142 and the number indicated on the pushbutton that has been depressed. Conveniently, a second row of pushbutton switches 146 is used to select the mode of operation of the printer, its speed of rotation and the torque provided by the various tensioning motors.

After the printer has been set up as desired by the power control panel 16, the operation of the printer may be controlled by the operator control panel 18. The operator control panel 18 includes a plurality of pushbuttons 148 that are used to start and stop the machine, and to select the direction of operation. A series of print control pushbuttons 150 and failure controls 152 are also provided, as are a pair of counters 154 and 156 which are used to select a forward direction and a reverse direction stop setting when film sections are being printed. A display 158 is used to display the total number of cues, fades, and footages run.

Figure 2:
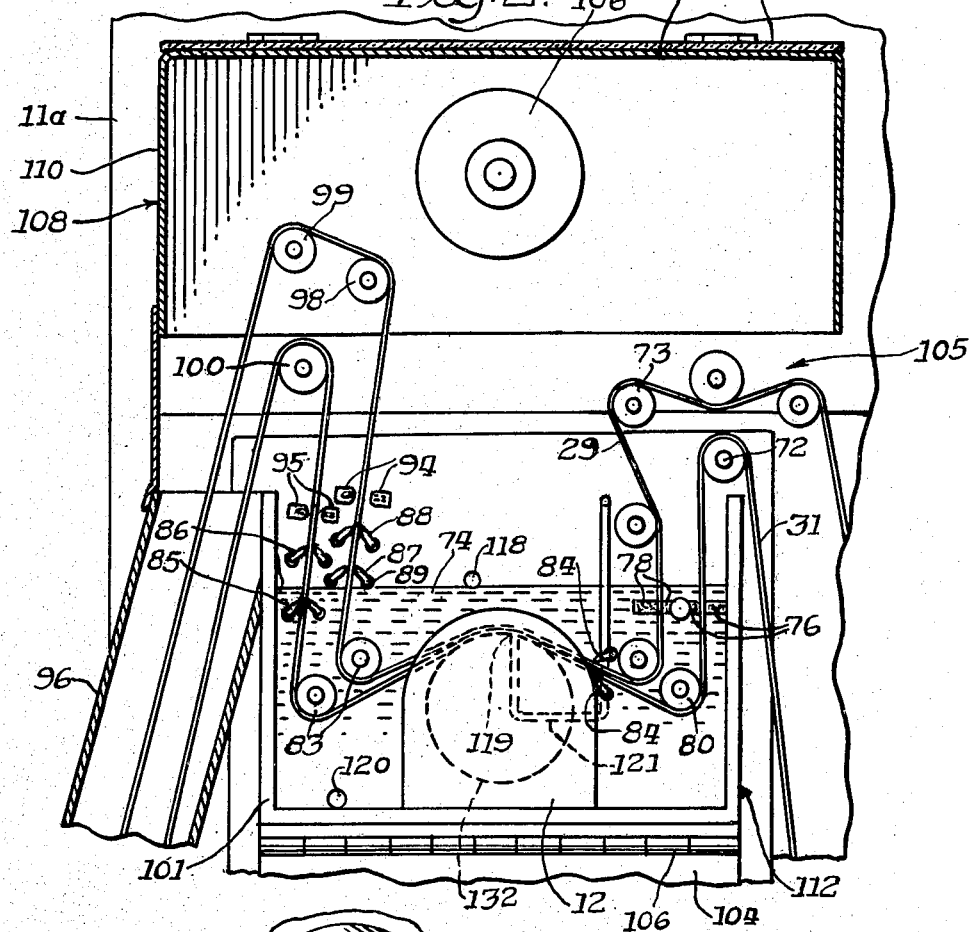
FIG. 2 is an enlarged, partial, front elevational view of the picture printing head module shown in FIG. 1.

Referring to FIG. 2, the operation of the picture printing head module 11a is illustrated. The picture master film 31 is fed over upper idler roller 72 and downwardly into liquid bath 74. The master 31 then passes between a pair of submerged, colinear, opposed wiper blades 76 positioned slightly below the surface of the bath 74. The raw stock 29 follows a generally parallel path over idler roller 73 and between an identical set of submerged, opposed, colinear wipers 78. The raw stock 29 and the master 31 are then forwarded over the picture head 12 in contact with one another with the raw stock atop the master. Continuous contact between the raw stock 29, the master 31, and the printing head 12 is achieved by means of a pair of input an output idler rollers 80 and 83. The rollers 80 and 83 are spaced from printing head 12 on each side and positioned with their lower edges below the upper surface of the printing head 12 to tension the raw stock 29 and master 31 downwardly against each other and the printing head 12. Thus the two film strips are directed downwardly from upper rolls 72, 73, redirected upwardly around the lower edges of rollers 80, tensioned over printing head 12 and then forwarded under rollers 83 and over rollers 98, 100. Just prior to passing over the printing head 12, the master 31 and raw stock 29 are pressed together between a pair of opposed wipers 84 which serve to place the master and raw stock in close contact and to remove any bubbles before passage over the printing head 12. The wipers 84 converge toward the two film strips, conveniently intersecting them at an angle of about 45°.

After passage over the printing head and down around idler rollers 83, the master 31 and the exposed raw stock 29 move upward separately through four pairs of opposed wipers 85, 86, 87, and 88 each of which may be oriented at an angle of about 45° to the film. Since the first pair of master wipers 85 each extend convergently to a point of intersection above the liquid level from a point below the liquid level and the first raw stock wipers 87 positioned closest to the printing head 12 are arranged with their bases 89 just at the liquid level, the liquid removed from wipers 85 and 87 flows down the lower surface of the wipers and gently back into the liquid bath 74. A second pair of raw stock wipers 88 and a second pair of master wipers 86 are positioned directly above the respective first wipers 85 or 87. Excess liquid wiped by the second raw stock wipers 88 and second master wipers 86 flows down the moving film or drips onto the respective lower wipers 85 or 87 and flows over the wipers 85 or 87 gently back to the liquid bath. Each film 29 and 31 then passes between a pair of air strippers 94, 95 which direct a transverse high velocity blast of air at both sides of the film in order to remove any remaining liquid globules. The master 31 is then forwarded up over idler roller 100 and down into tunnel 96 while raw stock 29 passes up over idler rollers 98 and 99 and down into the same tunnel 96.

The liquid bath 74 is contained within an open box 102 having a U-shaped, upwardly facing frame 101 mounted on module 11a and a hinged door 104 which rotates around hinge 106 into sealing engagement with U-shaped frame 101. The interior of box 102 may be blackened to avoid adverse light reflections. The open top of box 102 is closed by an enclosure 108 having a downwardly facing U-shaped frame 110 which connects to the tunnel 96 on one side and which stops short of the upper edge of U-shaped frame 101 on the other side thereby creating a film entrance 105. A transparent door 112 shown in FIG. 1 forms the outer side of the enclosure 108 overlapping the upper surface 107 of door 104. The door 112 is mounted on hinges 114 arranged across the upper edge of the large enclosure 108. Located within enclosure 108, air exhaust 106 maintains a constant negative pressure within the enclosure 108 and the upper portion of box 102 in order to withdraw any noxious fumes generated by evaporation of the immersion bath 74. Associated equipment (not shown) filters the noxious elements from the air which is subsequently returned to the atmosphere.

The purity and level of the liquid bath 74 is maintained by a liquid outlet 118 and a liquid inlet 120. The liquid outlet is located near the liquid surface, preferably right at the liquid surface, and serves to continuously withdraw liquid from the bath. Since the liquid outlet is located just above the printing head 12, spaced slightly from center in the direction of film transport, the liquid outlet 118 also serves to suck bubbles and debris away from the printing head 12. The liquid inlet 120 is located near the bottom of the bath 74, spaced well away from the printing head 12 in the direction of film transport to minimally affect the liquid in the region of the printing head. This insures that bubbles or other turbulence caused by the incoming liquid does not disturb reproduction quality. The liquid removed by the liquid outlet 118 is processed by a filtering apparatus (not shown) to remove any contaminates and returned to the bath 74 via inlet 120 together with fresh liquid if necessary to maintain the liquid level.

Figure 3:
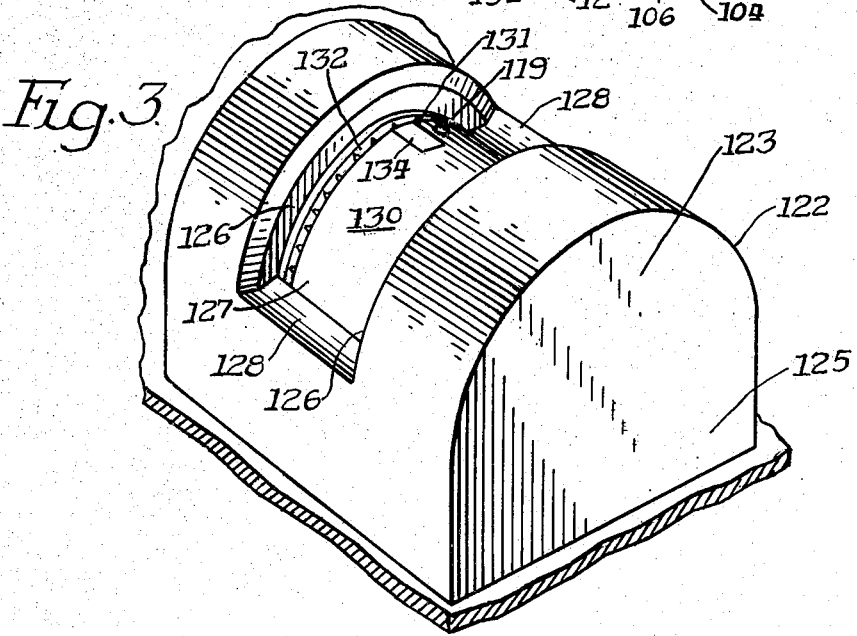
FIG. 3 is an enlarged, partial, perspective view of the printing head shown in FIG. 2.
Figure 4:
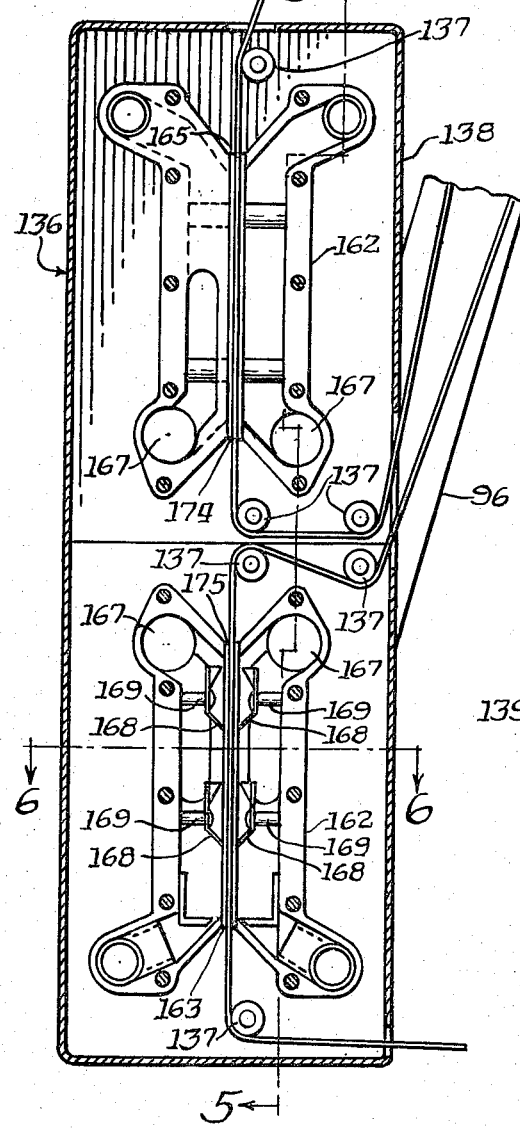
FIG. 4 is an enlarged cutaway view of the dryer housing shown in FIG. 1.
Figure 5:
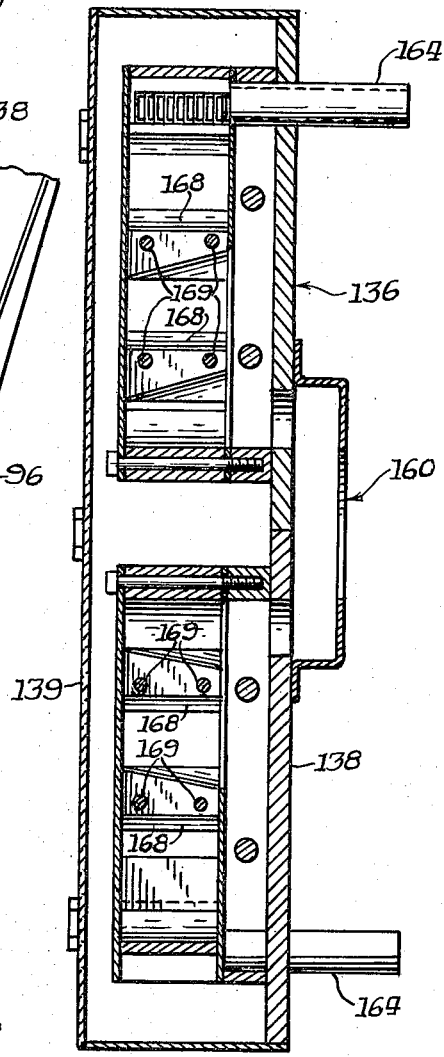
FIG. 5 is a cross-sectional view taken generally along the line 5—5 of FIG. 4.
Figure 6:
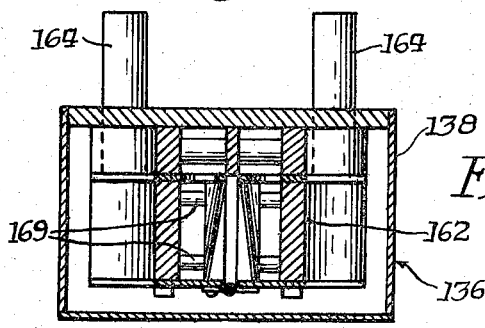
FIG. 6 is a cross-sectional view taken generally along the line 6—6 of FIG. 4.

The printing head 12, shown in FIG. 3, includes a totally submerged hump-shaped housing 122 having a rounded top portion 123 and a base portion 125 positioned on the bottom of box 102. Centered atop the top portion 123, a depression 127 is formed having opposed lateral edges 126, opposed longitudinal edges 128 and a rounded film supporting surface 130. As the master 31 and the raw stock 29 pass over the film supporting surface 130 to intimate contact, the edges of the two films are guided by opposed lateral edges 126. Preferably the raw stock and master remain in contact over 45° to 120° of the circumference of rounded top portion 123. Advantageously, no capstan is necessary in conjunction with head 12 thereby avoiding the turbulence generated by a capstan. In addition, a pair of motor driven sprocket gears 132, only one of which is shown in FIG. 3, are mounted within housing 122 with their teeth 131 extending radially outwardly from film supporting surface 130, each gear 132 positioned adjacent but spaced slightly from a lateral edge 126. The gears 132 forward the film over the printing head 12 by engaging the equally spaced holes along each edge of the film. A window 134 at the upper surface of film supporting surface 130 serves to transmit light from a light source (not shown) located in an air environment inside housing 122 through the master to expose the raw stock. Any conventional light source used for motion picture film reproduction can be used as the light source of the printing head 12, including, for example, a Model D printer light source made by Bell & Howell Company of Chicago, Ill. with its printing beam directed upwardly.

Referring to FIGS. 1 and 4-6 the exposed raw stock 29 and master 31 proceed through tunnel 96 and into dryer 136 mounted on removable module 11m. In the dryer each film is led around a pair of idler rollers 137 to extend divergently toward their respective take up spindles 22 or 28. The dryer 136 includes a dryer housing 138 having a hinged door closure 139 and an exhaust port 160. The master and raw stock each pass through a separate drying manifold 162 having a pair of air inlets 163, 165, positioned near the film exits 163, 165, on either side of the film which direct the inlet air towards the film. The hot air flows along each side of the film and out air outlets 167 near film inlets 174, 175. Since the air is hottest at its point of input, the film is exposed to progressively hotter air as it moves through the manifold thereby efficiently drying the film. Interposed in the air flow path within the manifold 162 are a plurality of generally U-shaped baffles 168, having forward ears 170 and arms 172 angled with respect to the air flow path, to create turbulence in the airstream which further aids in drying the wet film. The baffles 168 are supported on mounts 169 extending outwardly from the interior of manifolds 162.

The modulator construction of the printer permits rapid conversion of the printer to accommodate various film formats and facilitates repair since entire components mounted on modules may be removed from the printer. Similarly, all the modules need not be purchased at one time so that additional modules can be added when needed. Moreover, since the dryer 136 and the wet printing head 12 are each positioned on a separate module the components specific to wet printing can be removed and dry printing components used in their stead. To convert to dry printing the dryer module 11m is removed and closed. The printing head 12 module 11a is removed and replaced with a dry printing module. The fume exhaust 116 module 11k is also removed. The remaining components can be used in either a wet or dry printing arrangement and thus considerable interchangeability is achieved.

Obviously, many modifications and variations of the present invention are possible in light of the above teachings. For example, the invention could be implemented as an optical rather than a contact printer, or as a step contact printer rather than as a continuous contact printer. Thus, it is to be understood that, within the scope of the appended claims, the invention may be practiced otherwise than as specifically described above.

What is claimed and desired to be secured by Letters Patent of the United States is:

1. A modular wet film printer wherein the components specific to wet printing are removable to permit dry printing components to replace them when desired, said printer comprising:

a frame for receiving a plurality of removable modules;

a wet printing module removably located in said frame including a wet picture printing head;

an enclosure means for containing a printing head submerging bath and for retaining the fumes produced by the bath, said enclosure means including a liquid inlet situated away from said printing head located near the bottom of said enclosure means and a liquid outlet located near the printing head near the top of the liquid bath, said inlet spaced from said wet printing head in the direction in which the film is forwarded;

replaceable module means for removing the immersion liquid from the raw stock and master at high film transport speeds including a series of wipers positioned above the level of said immersion liquid, an air stripper positioned after said wipers along the path of movement of said raw stock and master and a dual drying tower having separate drying columns for the raw stock and master, each of said drying columns having air directing means for exposing said films to progressively hotter air as the films proceed through each column; and means for forwarding and taking up a film raw stock and a film master.

2. The printer of claim 1 including a plurality of wipers situated within said enclosure means, located at least partially above the liquid level in order to remove the liquid from the exposed raw stock and master and a plurality of wipers located below the liquid level to remove bubbles from the surface of said film preparatory to printing.

3. The printer of claim 2 including a plurality of air strippers for removing liquid from said film.

4. The printer of claim 1 including means to maintain a negative vacuum within said enclosure means.

5. The printer of claim 1 wherein said columns direct heated air counter to the direction of movement of said film so that the film is exposed to the hottest air last.

6. The printer of claim 1 including means spaced from said head for retaining a film master and raw stock in intimate contact over the printing head.

7. The printer of claim 1 including means for drawing liquid through said outlet, filtering said liquid and returning said liquid to said enclosure means through said liquid inlet.

8. The printer of claim 1 having a pair of opposed wipers positioned adjacent said printing head for pressing said raw stock and said master together before printing.

9. The printer of claim 6 wherein said means for retaining said master and said raw stock in intimate contact including two pairs of rollers, one pair positioned to either side of said printing head for pulling said raw stock and master down onto said printing head.

10. The printer of claim 1 including a printing head having a depression formed at its upper surface to guide said master and said raw stock over said head in intimate contact.

11. The printer of claim 1 including means for injecting liquid under pressure into the region between the film and the printing head just before the film is transported past the printing head.

12. The printer of claim 1 wherein said forwarding and taking up means includes a forwarding module removably receivable in said frame and a film take up module removably receivable in said frame.

13. The printer of claim 1 wherein said series of wipers are positioned along the path of travel of said film, with a first set of wipers contacting said immersion liquid bath arranged to wipe both sides of said raw stock and master and at least one additional set of wipers positioned above said first set so that the liquid wiped by said second set drains onto said first set and gently back to said bath.

* * * * *